United States Patent [19]
Bartlett et al.

[11] Patent Number: 5,511,130
[45] Date of Patent: Apr. 23, 1996

[54] SINGLE DIAPHRAGM SECOND ORDER DIFFERENTIAL MICROPHONE ASSEMBLY

[75] Inventors: Charles S. Bartlett, Clinton, Md.; Michael A. Zuniga, Fairfax, Va.

[73] Assignee: AT&T Corp., Murray Hill, N.J.

[21] Appl. No.: 237,798

[22] Filed: May 4, 1994

[51] Int. Cl.$^6$ .................................................. H04R 25/00
[52] U.S. Cl. ........................ 381/170; 381/168; 381/169; 381/154; 381/155
[58] Field of Search ...................... 381/168, 169, 381/170, 154, 155, 88, 91, 157, 122, 188, 205, 71, 94; 379/433

[56] References Cited

U.S. PATENT DOCUMENTS

| | | | |
|---|---|---|---|
| 2,640,110 | 5/1953 | Olson et al. | 381/170 |
| 4,584,702 | 4/1986 | Walker, Jr. | |
| 4,773,091 | 9/1988 | Busche et al. | |
| 4,850,016 | 7/1989 | Groves et al. | |
| 5,268,965 | 12/1993 | Badia et al. | 381/169 |

OTHER PUBLICATIONS

"Second-Order Gradient Noise Canceling Microphone," A. J. Brouns, *IEEE International Conference on Acoustics, Speech, and Signal Processing*, CH1610–5/81 (May 1981), pp. 786–789.

"A Second-Order Gradient Noise Canceling Microphone Using a Single Diaphragm," W. A. Beaverson and A. M. Wiggins, *J. Acoust. Soc. Am.*, vol. 22, No. 5, Sep. 1950, pp. 592–601.

"Adaptive Noise Cancelling: Principles and Applications," B. Widrow et al., *Proc. IEEE 63*, Dec. 1975, pp. 1692–1716.

"Second Order Gradient Uni-Directional Microphones Utilizing an Electret Transducer," G. M. Sessler and J. E. West, *J. Acoust. Soc. Amer.*, vol. 58, 1975, pp. 273–278.

"Autodirective Microphone System," J. L. Flanagan et al., *ACUSTICA*, vol. 73, 1991, pp. 58–71.

*Primary Examiner*—Curtis Kuntz
*Assistant Examiner*—Sinh Tran
*Attorney, Agent, or Firm*—Martin I. Finston

[57] ABSTRACT

A second-order differential (SOD) microphone includes a first-order differential (FOD) microphone element installed in a housing. A pair of front sound conduits extend from respective ports to a chamber on the front side of the microphone diaphragm, and a pair of rear sound conduits extend from respective ports to a chamber on the rear side of the microphone diaphragm. The two front ports and the two rear ports are all substantially collinear along a minor axis, with the rear ports intermediate the front ports or the front ports intermediate the rear ports. The respective acoustic transfer functions from each port to the microphone diaphragm are equivalent. The microphone response is approximately proportional to the second spatial derivative, along the minor axis, of a sampled acoustic pressure field.

10 Claims, 9 Drawing Sheets

TOP LUCITE SHEET

TOP VIEW

FIG. 9b

SIDE VIEW

SINGLE DIAPHRAGM SECOND ORDER DIFFERENTIAL MICROPHONE ASSEMBLY

BACKGROUND OF THE INVENTION

Second order differential (SOD) microphones have long been recognized for their superior noise cancelling performance relative to first order differential (FOD) or zero order differential (pressure) microphones. Early workers conceived making a SOD microphone by combining the outputs of two FOD microphones, or by combining the outputs of three or four pressure microphones. Such an approach requires the use of microphones whose amplitude and phase responses are very well matched.

Before electret microphones became available, typical off-the-shelf microphones did not exhibit the required match in amplitude and phase responses. Consequently, to produce a working SOD microphone with the then-existing technology, it was necessary to use a single FOD microphone with four distinct parts arranged to communicate equivalently with the microphone diaphragm. Single diaphragm SOD microphones were designed and built using, for example, either a moving coil or piezoelectric transducer mounted within an enclosure having sound ports to spatially sample the sound field. (See, for example, A. J. Brouns, "Second-Order Gradient Noise-Cancelling Microphone," *IEEE International Conference on Acoustics, Speech, and Signal Processing* CH1610-5/81 (May 1981) 786–789, and W. A. Beaverson and A. M. Wiggins, "A Second-Order Gradient Noise Canceling Microphone Using a Single Diaphragm," *J. Acoust. Soc. Am.* 22 (1950) 592–601.)

In some implementations, for example, the ports were placed symmetrically, at the four corners of a square, around the FOD microphone to ensure that the acoustic response of the diaphragm to each of the ports was identical. These single diaphragm SOD microphones produced an output signal proportional to the biaxial second order derivative $$\frac{d^2}{dxdy}$$

of the sound pressure field.

A later implementation, described in G. M. Sessler, and J. E. West, "Second order gradient uni-directional microphones utilizing an electret transducer," *J. Acoust. Soc. Amer.* 58 (1975) 273–278, incorporated an electret microphone element in a single diaphragm SOD microphone. Specifically, an experimental unidirectional SOD microphone was fabricated using an electret microphone into which tubes were inserted to sample the sound field at discrete points along an axis. (By "unidirectional" is meant that the microphone far-field sensitivity pattern is distinctly peaked in a preferred direction.) The tube lengths and their positions in the front and rear cavities of the electret microphone were chosen to produce the desired unidirectional far-field response.

In order to achieve the desired second-order behavior, it was necessary to precisely tune the Helmholtz resonances of the cavities and the sensing tubes. The effort involved in this tuning operation detracted from the practicality of mass producing this SOD microphone.

We have found that when a SOD microphone is configured to produce an output signal proportional to the uniaxial second order derivative $$\frac{d^2}{dx^2}$$

instead of the biaxial derivative of the sound pressure field, it can take better advantage of the spherical wave nature of a speaker's voice field to maximize sensitivity to the speaker's voice. This property is discussed, for example, in a co-pending United States patent application filed by C. Bartlett and M. Zuniga on Apr. 21, 1994 under the title, "Noise-Canceling Differential Microphone Assembly."

Practitioners in the field of microphone design have hitherto failed to provide a single diaphragm SOD microphone that is easy to mass produce, and that has an output proportional to a uniaxial second order derivative $$\frac{d^2}{dx^2}$$

of the acoustic pressure field.

SUMMARY OF THE INVENTION

We have invented a single diaphragm SOD microphone that is readily mass produced. It includes an enclosure into which a commercially available FOD microphone element, such as an electret microphone element, is readily inserted, without the need for penetrating the casing of the microphone element as provided by the commercial supplier. The output of our microphone (within a practical frequency range) is proportional to a uniaxial, second order derivative of the acoustic pressure field.

In a broad sense, our invention involves a first-order differential microphone mounted within a housing. Within the housing, a front cavity is defined adjacent the front side of the microphone diaphragm, and similarly, a rear cavity adjacent the rear side of the diaphragm. A pair of conduits, referred to as front conduits, conduct acoustic energy from respective first and second front ports to the front cavity, and similarly, a pair of rear conduits conduct acoustic energy from respective first and second rear ports to the rear cavity.

All four conduits have equivalent acoustic transfer functions from the respective ports to the diaphragm. (By "equivalent" is meant that they may be treated as equal for the purpose of making practical predictions of microphone behavior.) To make these transfer functions equivalent, the four ports have equivalent cross-sectional areas, the front and rear cavities have equivalent volumes, and the four conduits have equivalent lengths and cross-sectional areas, and meet their respective cavities in an acoustically equivalent manner.

The cavity, conduit, and port dimensions are such that the acoustical system consisting of the microphone, cavities, conduits, and ports has no more than one acoustic resonant frequency less than 3500 Hz, and no Helmholtz resonant frequency less than 3500 Hz. Moreover, the four ports are substantially collinear along an axis, which is here denoted the "minor axis". According to the arrangement of the ports, the rear ports are intermediate the front ports, or the front ports are intermediate the rear ports. Each front port is separated an equal distance from the adjacent rear port. As a consequence, the microphone response is approximately proportional to the second spatial derivative, along the minor axis, of a sampled acoustic pressure field. This will be true for sound fields within a practical frequency range, in typical applications the telephone band of about 300 Hz–3.5 kHz.

DETAILED DESCRIPTION OF THE INVENTION

Figure 1:
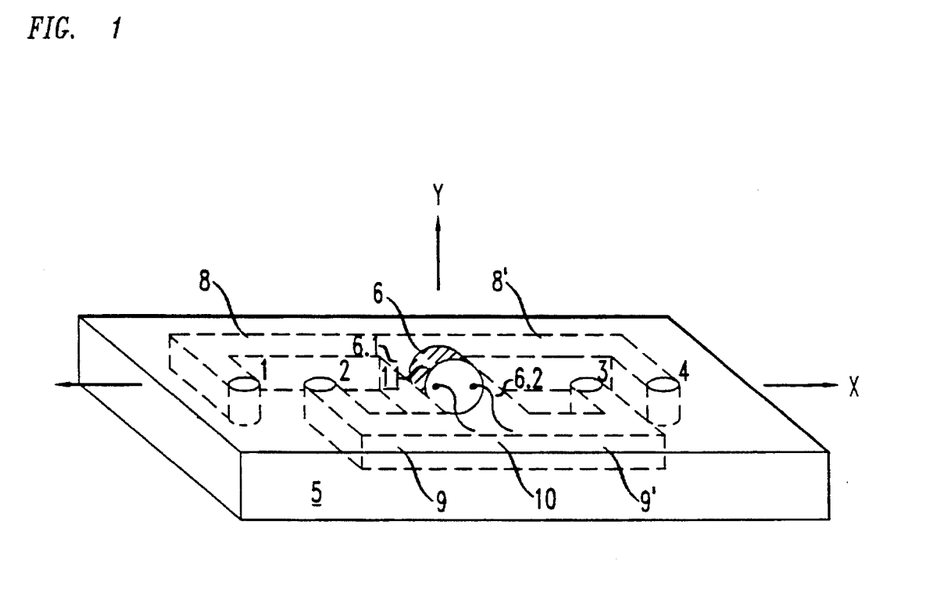
FIG. 1 is a schematic, perspective view of the inventive microphone in one embodiment.

According to a currently preferred embodiment of the invention as shown in FIG. 1, sound ducts 8, 8', 9, and 9' are formed in a slab-like base member 5 of an acoustically rigid material such as polymethyl methacrylate (PMMA), phenolic, or hard rubber. These ducts lead to a central cavity 6. At the end opposite of cavity 6, each sound duct terminates in a respective one of ports 1–4 for admitting sampled acoustic energy. The centers of ports 1–4 lie substantially along a linear axis herein denoted the "minor axis." FOD microphone 11 is inserted in cavity 6 in such a way as to form a seal between front cavity subportion 6.1 adjacent the front of the microphone, and rear cavity subportion 6.2 adjacent the rear of the microphone, such that the respective subportions are acoustically isolated from each other. The cavity subportions are referred to hereinafter as respective front and rear chambers.

It should be noted that the terms "front" and "rear" as used herein are arbitrary, and have been adopted as a matter of convenience. It will be understood that these terms are interchangeable, as are the terms "top" and "bottom", and "upper" and "lower" when referring to spatial properties of base member 5.

A mounting element 7, such as a rubber ring, is useful for effecting this seal. We currently prefer to use an electset microphone. Appropriate such microphones are commercially available from numerous suppliers.

The ports communicating with the rear of the microphone should lie intermediate those communicating with the front of the microphone (as shown in the FIG.1), or vice versa. The distance between ports 1 and 2 should equal the distance between ports 3 and 4 within practical tolerances for the microphone to function as a SOD microphone.

As noted, the sound ducts should be of equal cross-sectional area and length (within practical tolerances), the ports should be of equal area, and the chambers 6.1 and 6.2 should be of equal volume. The transverse dimensions of the ducts and the port diameters should be much less than a wavelength of sound at the highest frequency of interest. (As a general rule, it will be sufficient if these dimensions are less than 0.1 wavelength.) For example, the highest frequency of interest for telephonic applications is generally 3.5 kHz, corresponding to a wavelength under typical operating conditions of about 10 cm.

The midpoint between ports 1 and 2 is separated from the midpoint between ports 3 and 4 by a distance referred to herein as the "minor diameter." While accommodating a given minor diameter, it is desirable to make the dimensions of the ports, ducts, and front and rear chambers small enough to exclude troublesome resonances. For example, if the microphone is intended to operate in the telephone band, these dimensions are readily chosen such that no Helmholtz resonance occurs at a frequency less than 3500 Hz, and no more than one acoustic resonance (of any kind) occurs at a frequency less than 3500 Hz. In fact, it will often be possible to exclude all acoustic resonances within the telephone band.

As a consequence of this arrangement, the pressures $P_1$ and $P_4$ of a sound field at openings 1 and 4 are guided through ducts 8, 8' to the front face of microphone 11 in a manner identical to the way that pressures $P_2$ and $P_3$ of the sound field at openings 2 and 3 are guided through ducts 9, 9' to the rear microphone face. The acoustic transfer function from each port to the microphone diaphragm is, at least in a practical sense, the same. As a result, microphone 11 produces a signal output, at electrical leads 10, that is proportional to the net pressure difference across the front and rear microphone faces. That is, $$\text{Signal output} = K(\omega)[(P_1 + P_4) - (P_2 + P_3)],$$

where $K(\omega)$ is a frequency dependent proportionality constant whose primary frequency dependence is due to the identical longitudinal resonances in ducts 8 and 9, the first of which occurs at a frequency for which the duct length is equal to a half wavelength.

The signal output expression may be recast as $$K(\omega)[(P_1 - P_2) - (P_3 - P_4),]$$

where $(P_1 - P_2)$ is the first order differential of the sound field between ports 1 and 2, and $(P_3 - P_4)$ is the first order differential of the sound field between ports 3 and 4. Consequently, the signal output of FOD microphone 11 is approximately proportional to the uniaxial second order differential of the sound field pressure along the minor axis connecting the centers of the sound ports 1, 2, 3, and 4.

Figure 2:
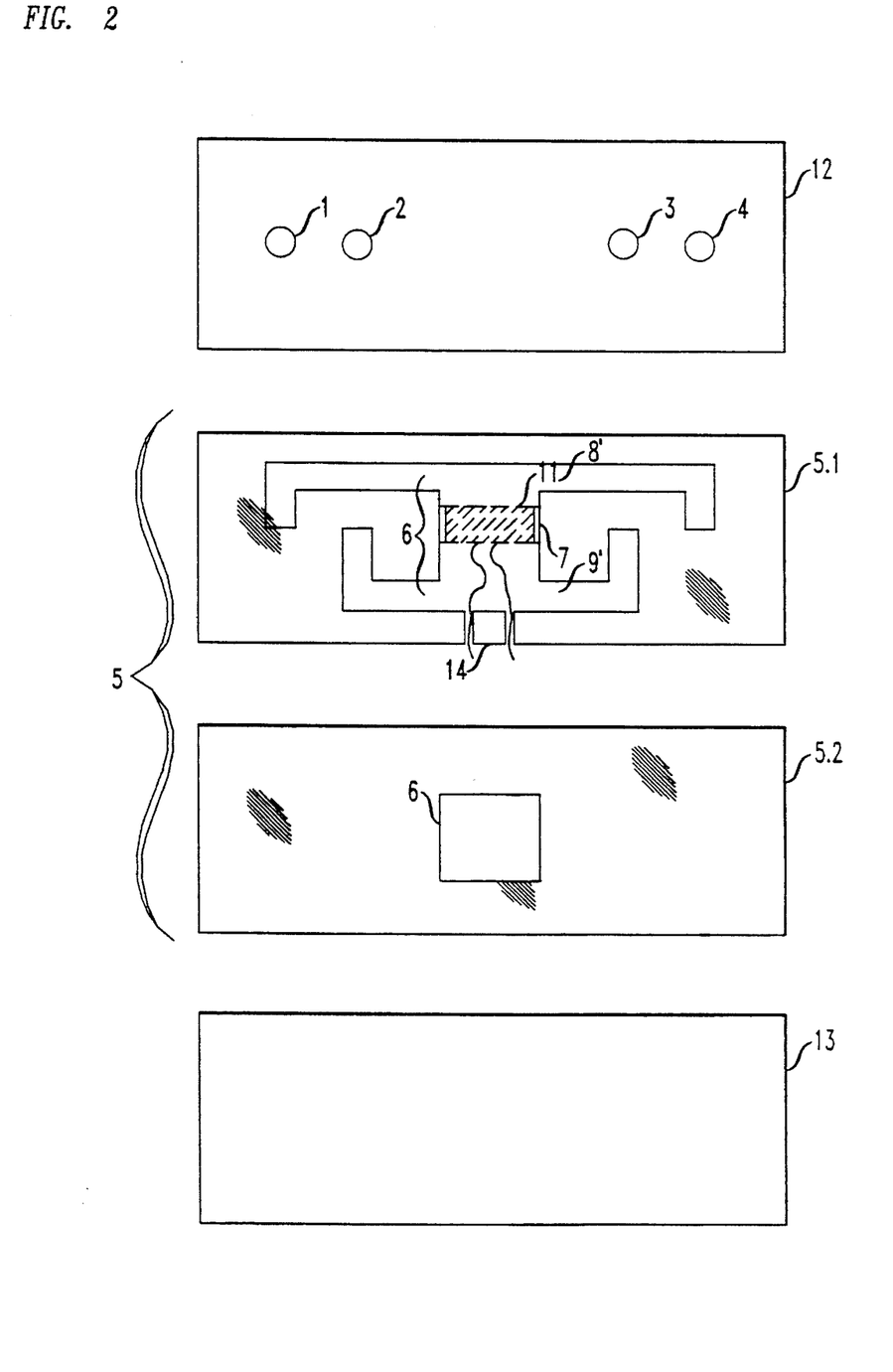
FIG. 2 illustrates an exemplary division of the base member of the microphone of FIG. 1 into conveniently manufactured and assembled pans.

We have built a readily manufacturable housing prototype for the FOD microphone, shown in FIG. 2. In this exemplary embodiment, slab 5 consists of two 0.125-in sheets of PMMA. Ducts 8, 8', 9, and 9', and the upper half of FOD microphone cavity 6, are cut all the way through upper sheet 5.1, exemplarily by stamping or milling. (Other manufacturing processes are also possible, such as molding processes in which the ducts and cavity are made by excluding material.) By a similar process, the lower half of cavity 6 is formed in lower sheet 5.2.

The combined thickness of the upper and lower sheets when assembled is 0.25 in, which is approximately equal to the diameter of our exemplary FOD microphone. A 0.010-in brass top cover plate 12 serves to acoustically seal the top of the ducts. Round, 0.125-in-diameter sound ports 1–4 are drilled through plate 12, and positioned to align with the terminations of the corresponding ducts when the housing is assembled.

A 0.010 in brass bottom cover plate 13 serves to acoustically seal the bottom of microphone cavity 6. The electrical leads 10 of FOD microphone 11 are directed through small channels 14 between upper and lower sheets 5.1, 5.2. These channels are desirably filled with an air-tight sealant surrounding the electrical leads to prevent acoustic leakage.

Figure 3:
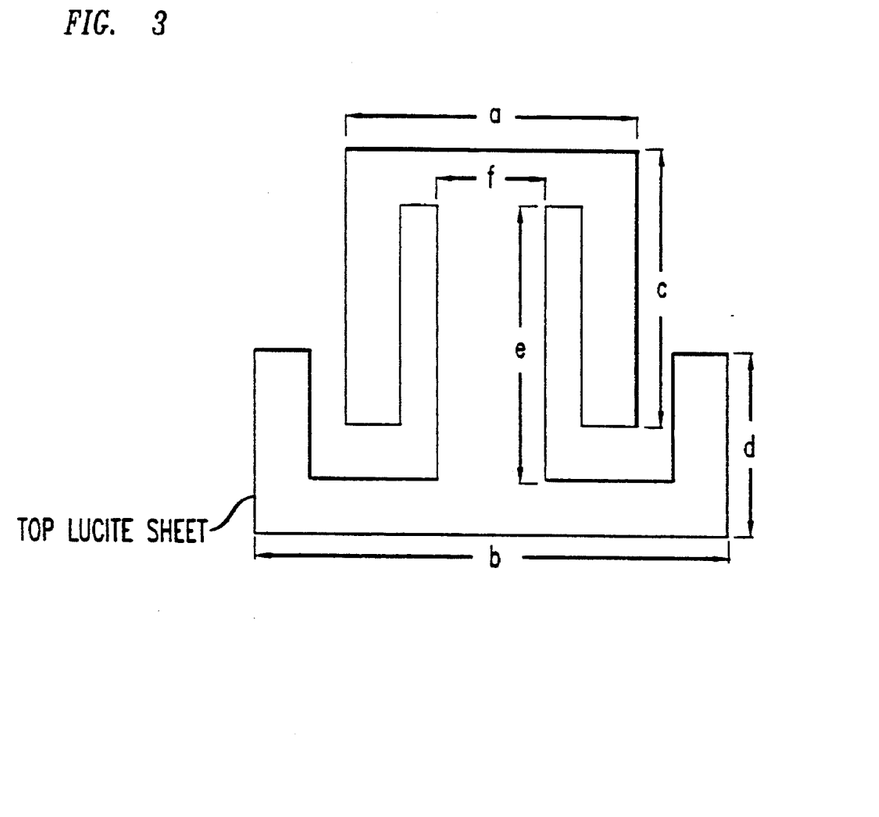
FIG. 3 is an illustrative pattern for the sound ducts of the microphone of FIGS. 1 and 2.

By way of illustration, the lateral dimensions of the microphone cavity of our prototype (as defined in the lower sheet) were 10.73 mm×6.05 mm. The corresponding dimensions of the ducts and cavity as defined in the upper sheet are conveniently described with reference to FIG. 3. All duct widths were 3.0 mm. The other dimensions were: a, 16.0 mm; b, 26.0 mm; c, 13.0 mm; d, 8.0 mm; e, 12.0 mm; and f, 6.0 mm.

For convenience, our prototype was made from two plastic sheets and two brass sheets. It should be noted that there are numerous other ways to subdivide the overall assembly. For example, the ducts and microphone cavity may be formed by removing material only partway through the upper and lower sheets (which are made somewhat thicker than in the above-described prototype), so that the upper sheet is one continuous piece with the top cover plate, and the lower sheet is one continuous piece with the bottom cover plate. This would conveniently be done, for example, in an injection molding operation. The FOD microphone element would be inserted in its cavity just before final assembly of the upper and lower sheets.

In another alternate embodiment, some of the ducts may be formed in the lower sheet, and others formed in the upper sheet.

Figure 8:
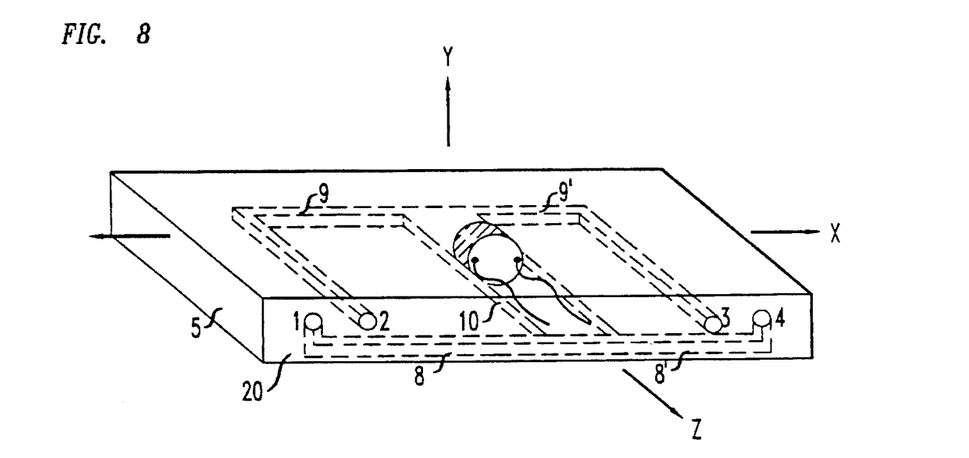
FIG. 8 is a schematic, perspective view of the inventive microphone in an alternate embodiment.

In the embodiment of FIG. 8, the ports are situated on a side face 20 of base member 5, rather than on the top (or bottom) surface. This arrangement is desirable because it allows the two dimensions of the base member that are perpendicular to the minor axis to be made relatively small, leading to a compact design.

Figure 9A:
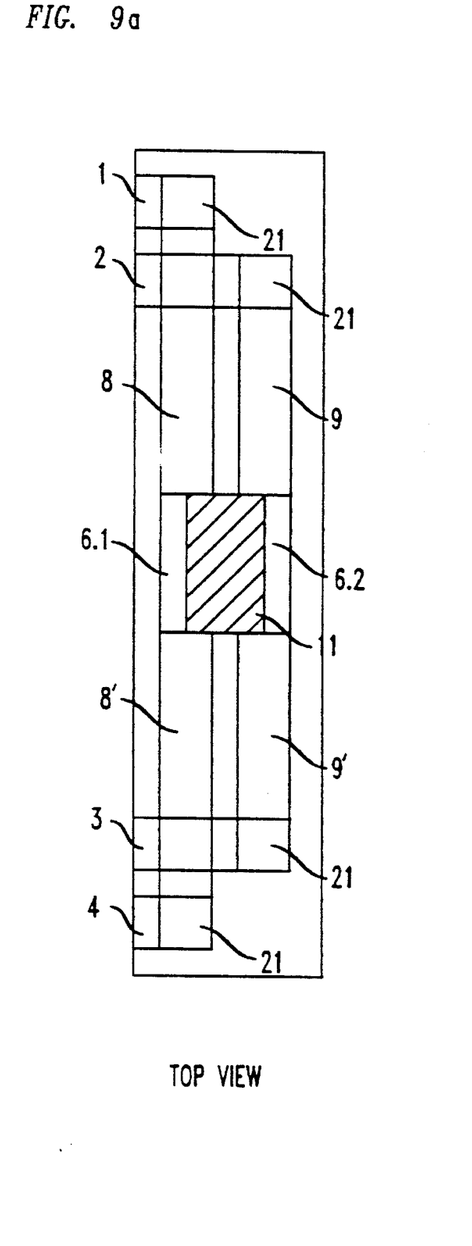
FIG. 9 illustrates an exemplary, easily manufactured design for the microphone of FIG. 8.
Figure 9B:
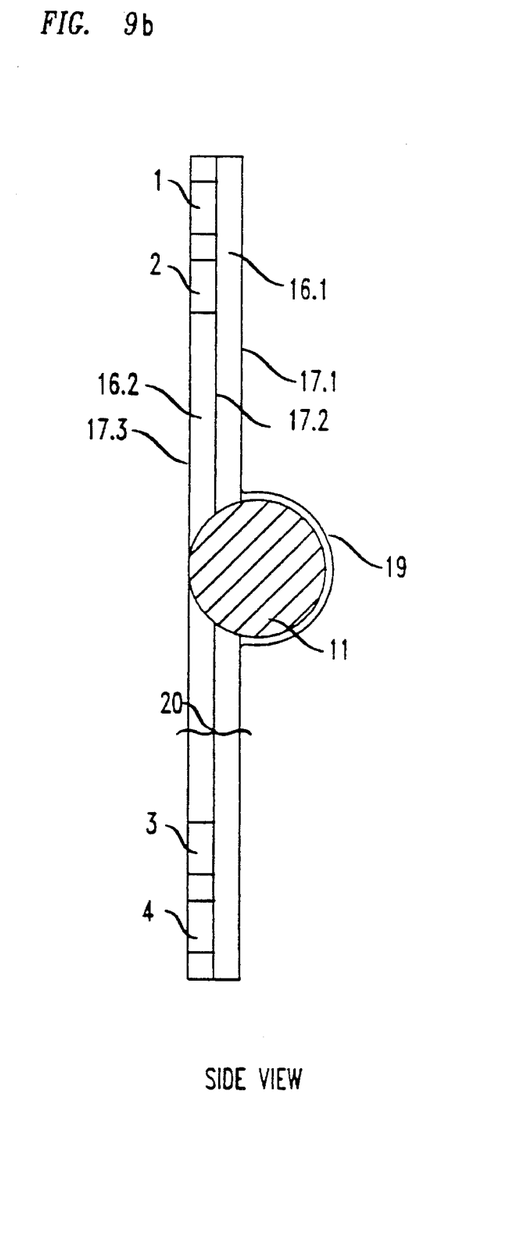

A currently preferred design of this kind is shown in cross sectional view in FIG. 9. In this design, PMMA sheets 16.1 and 16.2 are interleaved with thin, acoustically rigid plates 17.1, 17.2, 17.3, which are exemplarily made of brass. Chambers 6.1 and 6.2 are defined in upper sheet 16.1. Each of rectangular ducts 8, 8', 9, and 9' has a portion defined in sheet 16.1 that meets its respective chamber, and a portion defined in lower sheet 16.2 that meets face 20 to form a respective one of ports 1–4 that is rectangular in shape. Each duct includes a respective ascending portion 21 that joins the respective lower-sheet and upper-sheet portions of the duct. Each ascending portion 21 is defined, at least in part, by a rectangular perforation in plate 17.2.

Exemplarily, the PMMA sheets are 1 mm thick, and the overall assembly is 44 mm long, 7 mm wide, and 2.844 mm thick. Microphone element 11 will typically be larger in diameter than the assembled thickness of the PMMA sheets and brass plates. Accordingly, the microphone element will typically protrude above the top surface of sheet 16.1. In such a case, cover member 19 is used to seal over the microphone element. Cover member 19 is exemplarily a brass plate, and may conveniently be made continuous with plate 17.1, for example by forming it in a stamping operation.

Optionally, microphone element 11 is placed symmetrically such that it protrudes by equal amounts above plate 17.1 and below plate 17.3. In such a case, a second cover member is readily incorporated to seal over the microphone portion protruding below plate 17.3.

As noted, layered structures such as those described above have the advantage that they are easily manufactured. In particular, they are highly reproducible because conventional manufacturing methods can be used to accurately match the duct and port characteristics from one workpiece to another.

Figure 4:
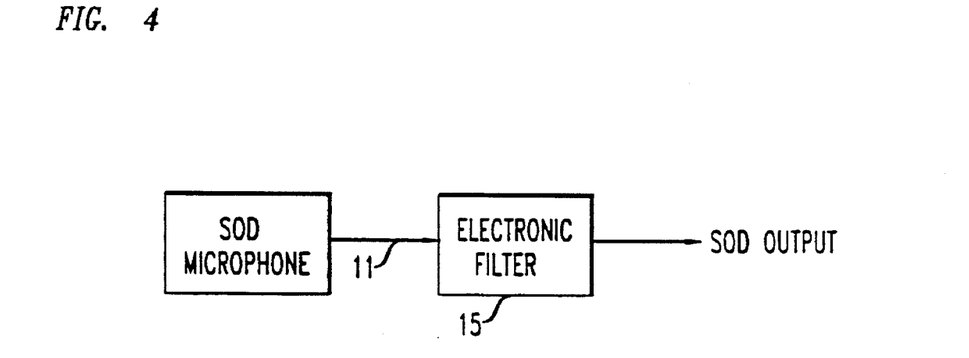
FIG. 4 illustrates the use of an electronic filter in conjunction with the inventive microphone.

As shown in FIG. 4, the electrical output of microphone 11 is advantageously modified by electronic filter 15, to make the voice response of the microphone match a desired reference response, such as the voice response of a standard, omnidirectional microphone.

Figure 5:
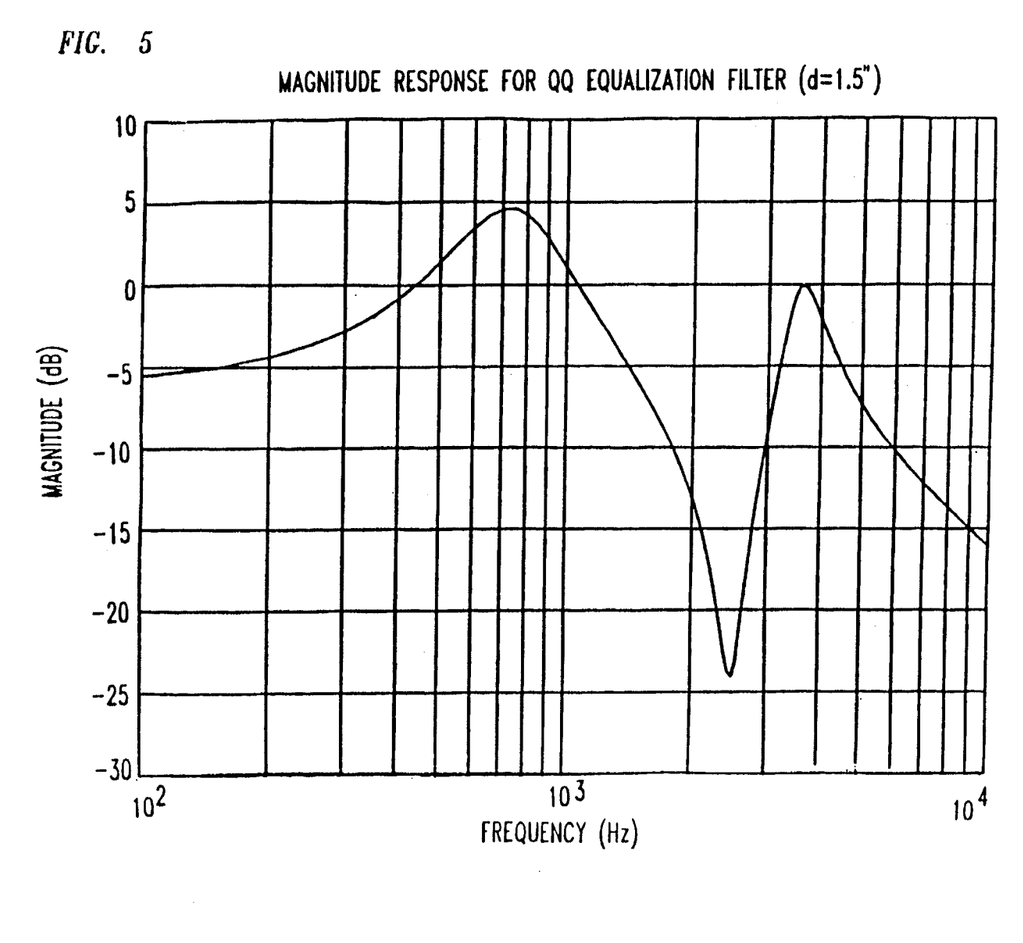
FIGS. 5 and 6 are illustrative response curves for the electronic filter of FIG. 4.

By way of illustration, FIG. 5 is a transfer function for an electronic filter useful in connection with a laboratory prototype having a duct resonance within the frequency band of interest. The notch behavior apparent near 2–3 kHz compensates this duct resonance.

Figure 6:
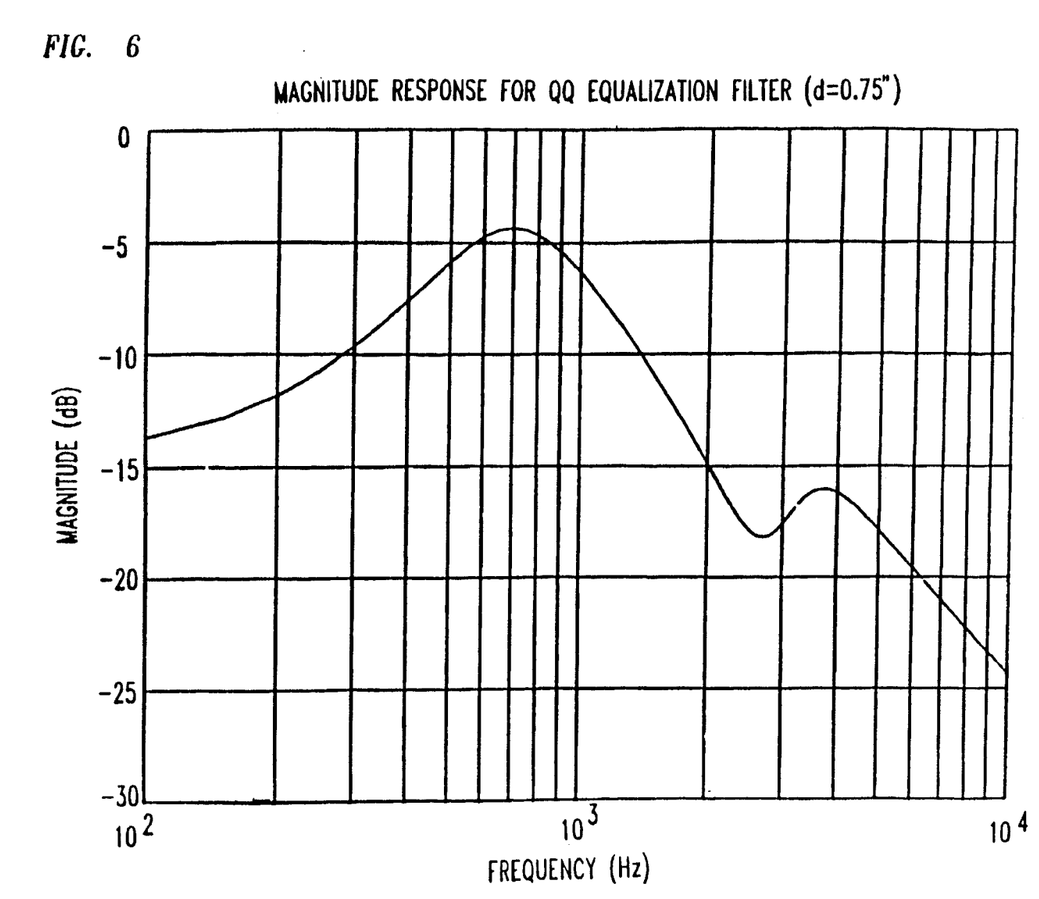

By contrast, the transfer function of FIG. 6 is useful in connection with a laboratory prototype whose duct resonance lies outside the frequency band of interest. In this case, filter 15 does not need a notch to compensate a duct resonance.

Figure 7:
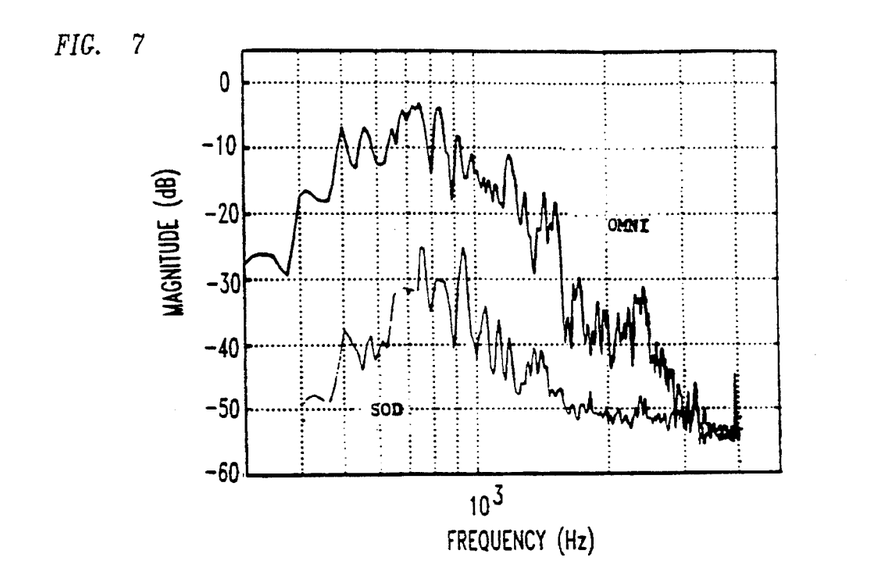
FIG. 7 compares the ambient noise responses of the inventive microphone and a standard, omnidirectional microphone.

Compared in FIG. 7 are the response of the inventive SOD microphone and the response of an omnidirectional microphone to ambient, far-field noise. Represented in the figure is the performance of each microphone type as mounted on a telephone handset. An electronic filter is used with the SOD microphone to equalize its (spectral) voice response to that of the omnidirectional microphone. It is apparent from the figure that a reduction of 10 dB or more is achieved over substantial portions of the telephone band.

It is well known that in telephonic applications, the sound field of a speaker's voice can be modeled, to a good approximation, as the radially divergent field of a point source. Such a source 40 is depicted schematically in FIG. 12, together with schematic representations of ports 1–4. As described in the above-cited patent application titled "Noise-Canceling Differential Microphone Assembly," this property can be used to enhance the transmitted response of a SOD microphone to the speaker's voice, relative to the response to the ambient noise. That is, let the x-axis of FIG. 12, which extends from source 40 to the midpoint of ports 1–4, be denoted the "major axis," and let the source-to-midpoint distance $a$ be denoted the "major radius." When the major and minor axes are mutually perpendicular, the uniaxial second-order differential output of the microphone will be approximately proportional to the first-order derivative of the speaker's sound field (along the minor axis). By contrast, the response to diffuse, far-field noise will not depend preferentially on a particular microphone orientation. Thus, with respect to the manner in which the voice response depends on distance from the speaker's lips, the microphone will respond like a FOD to the speaker's voice, but like a SOD to far-field noise. Good noise rejection will result because in typical diffuse noise environments, the second spatial derivative of the acoustic pressure field is even smaller than its first spatial derivative.

Figure 12:
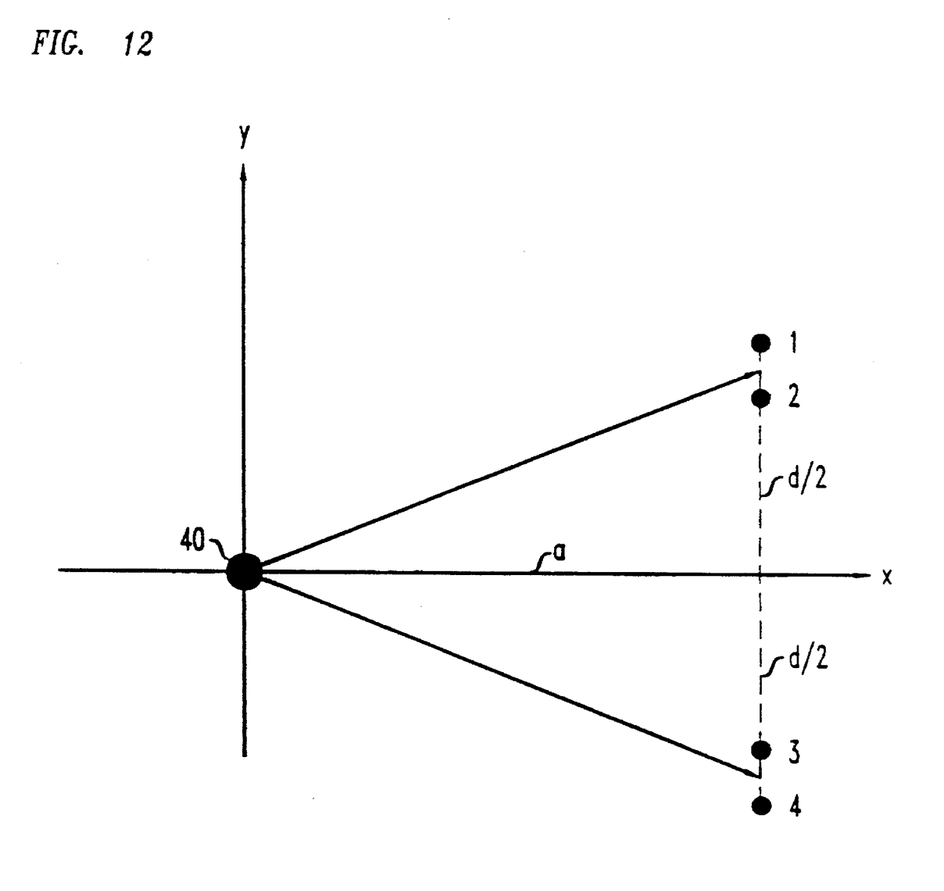
FIG. 12 is a schematic drawing illustrating a preferred orientation for the inventive microphone, relative to an effective point source of a near-field acoustic signal.

The magnitude of the output from a SOD microphone in this special orientation can be compared with the magnitude of the output from a single FOD microphone situated at the midpoint of the minor axis and oriented for maximum sensitivity to sound from the point source. Theoretically, the SOD:FOD ratio of these magnitudes is given by the expression:

$$\text{Ratio} = \left( \frac{4z^2[1 + (ka)^2(1 + z^2)]}{[1 + (ka)^2][1 + z^2]^3} \right)^{1/2}$$

where $z=d/(2a)$, d is the minor diameter, $k=\omega/c$, $\omega$ is the angular frequency, and $c$ is the speed of sound in air.

To an excellent approximation (provided the distance $a$, in units of one wavelength at the given frequency, is much smaller than $$\frac{1}{2\pi}),$$

the SOD output is maximal (relative to the hypothetical FOD output), without regard to frequency, when $d=1.4a$. This design formula may be used to optimize the geometric configuration of the microphone assembly for a particular communications device based upon the expected distance between the assembly and the user's lips.

It should be noted in this regard that the minor diameter will often at least partly determine the lengths of the ducts. It is clear from the above discussion that in typical communications applications, the minor diameter will often be significantly smaller than a wavelength, even at the high-frequency end of the telephone band. As a result, it will often be possible to make duct short enough to exclude all acoustic resonances within the telephone band.

Figure 10:
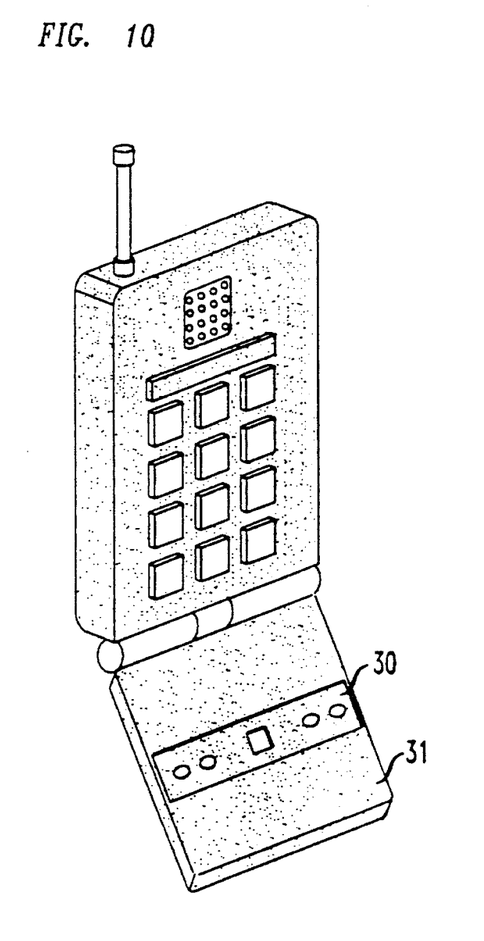
FIG. 10 illustrates the use of the microphone of FIG. 1 in a cellular telephone handset.
Figure 11:
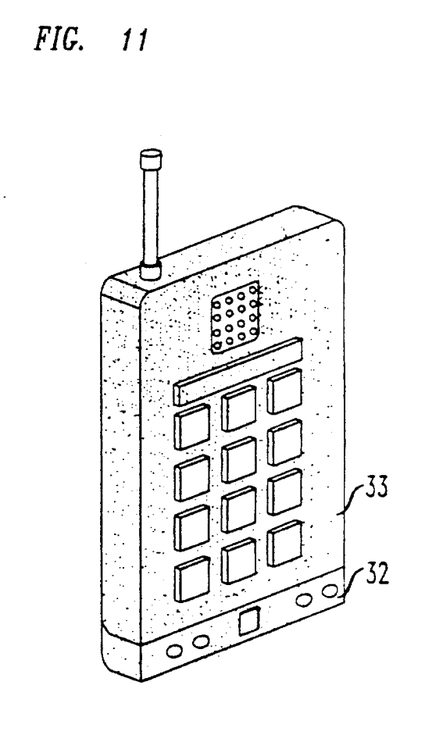
FIG. 11 illustrates the use of the microphone of FIG. 8 in a cellular telephone handset.

An illustrative application of the inventive microphone is in a cellular telephone handset, as shown in FIGS. 10 and 11. In FIG. 10, microphone 30, similar in design to the microphone of FIG. 1, is shown installed in flip portion 31 of a handset, where there is ample space in the lateral dimension perpendicular to the minor axis. By contrast, FIG. 11 depicts microphone 32 installed in base 33 of a handset. Here, a more compact design is typically needed. Accordingly, microphone 32 is similar in design to the microphone of FIGS. 8 and 9.

We claim:

1. Apparatus comprising:
   a) a housing;
   b) mounted within the housing, a first-order differential microphone having a diaphragm, the diaphragm having a front side and a rear side;
   c) defined within the housing, a front cavity adjacent the front side of the diaphragm, and a rear cavity adjacent the rear side of the diaphragm;
   d) a first and a second front conduit for conducting acoustic energy from respective first and second front ports to the front cavity; and
   e) a first and a second rear conduit for conducting acoustic energy from respective first and second rear ports to the rear cavity, wherein:
   f) each of said ports has equivalent cross-sectional area, each of said cavities has equivalent volume, and each of said conduits has equivalent length and cross-sectional area and meets its respective cavity in an acoustically equivalent manner, such that each of said conduits has an equivalent acoustic transfer function from its respective port to the diaphragm; CHARACTERIZED IN THAT
   g) the cavity volume, the conduit length and cross-sectional area, and the port cross-sectional area are adapted such that the acoustical system consisting of the microphone, cavities, conduits, and ports has no more than one acoustic resonant frequency less than 3500 Hz, and no Helmholtz resonant frequency less than 3500 Hz;
   h) the first and second front ports and the first and second rear ports are all substantially collinear along an axis to be referred to as the minor axis; and
   i) said ports are arranged such that the rear ports are intermediate the front ports or the front ports are intermediate the rear ports, and each front port is separated an equal distance from the adjacent rear port, whereby the microphone response will be approximately proportional to the second spatial derivative, along the minor axis, of a sampled acoustic pressure field.

2. Apparatus of claim 1, wherein the microphone is an electret microphone.

3. Apparatus of claim 1, wherein the acoustical system has a frequency-dependent response function, and the apparatus further comprises an electronic filter for modifying said response function in a predetermined manner.

4. Apparatus of claim 1, wherein:

a minor diameter d is defined as the average of the distance between the front ports and the distance between the rear ports;

a major radius is defined as a line segment extending a predetermined optimum distance a between a speaker's lips and the midpoint between the front or rear ports;

the apparatus further comprises support means for maintaining said midpoint a distance of approximately a from a speaker's lips when the apparatus is in use, and for maintaining the minor axis approximately perpendicular to the major radius; and the distance d is adapted such that the ratio d/a is near the value that optimizes the theoretical sensitivity, to the speaker's voice, of the microphone in combination with the conduits and ports, relative to a hypothetical, equivalent microphone suspended in free space and oriented for maximum sensitivity.

5. Apparatus of claim 4, wherein the ratio d/a is approximately 1.4.

6. Apparatus of claim 1, wherein the housing comprises a body of acoustically rigid material, and each of said conduits is an elongated, hollow region defined by inner surfaces of said body.

7. Apparatus of claim 6, wherein:

the body comprises a top layer having a substantially planar lower surface and a bottom layer having a substantially planar upper surface;

at least one of the conduits comprises a channel formed in the bottom layer, said channel extending in one or two longitudinal dimensions substantially parallel to said upper surface and having a total length in the longitudinal directions;

said channel extends from said upper surface to a depth, in the direction perpendicular to said upper surface, that is smaller than the total length; and the top layer overlies the bottom layer such that said upper and lower surfaces are in contact and the top layer forms an acoustically sealing cover for said channel.

8. Apparatus of claim 7, wherein each of the conduits comprises a channel formed in the bottom layer.

9. Apparatus of claim 7, wherein each of the conduits comprises a channel formed in the top layer interconnected to a channel formed in the bottom layer, the top layer forms an acoustically sealing cover for the channels formed in the bottom layer, and the bottom layer forms an acoustically sealing cover for the channels formed in the top layer.

10. Apparatus comprising a first-order differential microphone having front and rear faces, wherein the front face is in acoustic communication with first and second front acoustic conduits through a front cavity, the rear face is in acoustic communication with first and second rear acoustic conduits through a rear cavity, each conduit is terminated by a respective port for admission of acoustic energy, and the ports are so arranged that the response of the microphone will be approximately proportional to a second spatial derivative of a sampled acoustic pressure field, CHARACTERIZED IN THAT:

a) the apparatus further comprises a slab-like base comprising an acoustically rigid material and having a substantially planar surface, to be referred to as the top base surface;

b) a pattern of channels is formed in the base, wherein the pattern is defined by interior surfaces of the base, the channels are open at the top base surface, and the channels extend in at least one longitudinal direction substantially parallel to the top base surface;

c) the pattern comprises four channels of equal length and cross sectional area, and each of said four channels is identified with a respective one of the acoustic conduits, so that the channels will be referred to, respectively, as the first and second front channels and first and second rear channels;

d) the pattern further comprises a central cavity having a front end joined to the front channels and a rear end joined to the rear channels;

e) the microphone is mounted in the central cavity such that the portion of the central cavity unoccupied by the microphone is subdivided into mutually acoustically isolated front and rear portions of equal volumes, wherein: the front portion adjoins the front channels and the microphone front face, and is identified with the front cavity; and the rear portion adjoins the rear channels and the microphone rear face and is identified with the rear cavity;

f) each port is an opening in a surface of the base;

g) the ports are arranged substantially along a straight line, the rear ports are intermediate the front ports or the front ports are intermediate the rear ports, and each front port is distant by the same amount from its adjacent rear port, such that the second spatial derivative to be represented by the microphone response is a uniaxial derivative;

h) the apparatus further comprises a cover having a substantially planar surface, to be referred to as the bottom cover surface; and i) the bottom cover surface is affixed in contact with the top base surface such that the cover forms an acoustically sealing closure for the channel pattern.

* * * * *